United States Patent [19]
Liu et al.

[11] 3,907,760
[45] Sept. 23, 1975

[54] PROCESS FOR MANUFACTURE OF HIGH BULK DENSITY POWDERS OF OLEFIN POLYMERS

[75] Inventors: Gordon Y. T. Liu, Baton Rouge; Donald R. Smith, East Baton Rouge; Robert D. Bridges, Parish, all of La.

[73] Assignee: The Dow Chemical Company, Midland, Mich.

[22] Filed: Feb. 16, 1971

[21] Appl. No.: 115,881

[52] U.S. Cl........ 260/88.2 R; 252/429 C; 260/93.7; 260/94.9 B; 260/94.9 E
[51] Int. Cl.$^2$. C08F 4/16; C08F 10/02; C08F 10/04
[58] Field of Search ......... 260/94.9 B, 94.9 E, 88.2, 260/93.7

[56] References Cited
UNITED STATES PATENTS 3,058,963  10/1962  Vandenberg...................... 260/94.9
3,271,381  9/1966  Andersen et al.................... 260/94.9

FOREIGN PATENTS OR APPLICATIONS 960,232  6/1964  United Kingdom
927,785  6/1963  United Kingdom
1,111,493  4/1968  United Kingdom............ 260/94.9 E

*Primary Examiner*—Edward J. Smith
*Attorney, Agent, or Firm*—M. S. Jenkins

[57] ABSTRACT

High bulk density powders of normally solid, olefin polymers such as polyethylene are provided by polymerizing the olefin under low pressures ranging from about 5 to about 30 atmospheres in the presence of trialkyl aluminum and a titanium-containing catalyst component which has been prepared from titanium tetrachloride and diethyl aluminum monochloride. High bulk density powders prepared in accordance with the present invention can be employed directly in extrusion and other fabrication operations.

10 Claims, No Drawings

PROCESS FOR MANUFACTURE OF HIGH BULK DENSITY POWDERS OF OLEFIN POLYMERS

BACKGROUND OF THE INVENTION

The present invention relates to a low pressure polymerization process for preparing high bulk density powders of olefin polymers.

The low pressure polymerization of alpha olefins with catalyst systems composed of a partially reduced, heavy transition metal component and an organometallic reducing component to form high density, high molecular weight, solid, relatively linear polymers is well known. Characteristically, such polymerizations are carried out in an inert organic liquid diluent under an inert atmosphere and at relatively low temperatures, e.g., 0° to 100°C and at low pressures, e.g., 0 to 5 atmospheres. Typical transition metal components are the halides, oxyhalides, alkoxides and the like of metals of Groups 4b, 5b, 6b and 8 of the Periodic Table of Elements appearing in the *Handbook of Chemistry and Physics*, 48th ed., Chemical Rubber Company. Common organometallic components include the metal alkyls, metal alkyl halides and dihalides, metal hydrides and similar compounds in which the metals are selected from Groups 1a, 2a and 3a of the same Periodic Table of Elements. The alpha olefin polymers produced by low pressure polymerization, particularly at relatively low temperatures, e.g., slurry temperatures, are generally recovered in the form of powders having very low bulk densities, e.g., less than about 27 pounds per cubic foot. Such low bulk density powders have such poor feeding characteristics for purposes of extrusion that they must be densified in an additional step, e.g., pelletizing or granulating, prior to extrusion or other fabrication. As this powder densification step substantially increases the cost of olefin polymer which can be fabricated, it is highly desirable to carry out polymerization of the olefin in a process which yields olefin polymer in the form of a high bulk density powder. By the term "high bulk density powder" is meant a particulate material having an average density of at least 25 pounds per cubic foot.

Heretofore, it has been taught, e.g., British Pat. No. 960,232, to prepare high bulk density powders by polymerizing an olefin at pressures of 1 to 30 atmospheres, preferably 2 to 4 atmospheres, in the presence of a catalyst composed of a titanium-containing catalyst component and diethyl aluminum monochloride or aluminum ethyl sesquichloride. Unfortunately, at lower pressures, which are preferred, and using diethyl aluminum halide as the activator, it has been found that extreme precautions regarding general conditions of polymerization must be taken in order to obtain the desired high bulk density powder. Even when such precautions are exercised, high bulk density powders can not be produced with the degree of consistency that is required in commercial operation.

SUMMARY OF THE INVENTION

The present invention is a polymerization process for consistently producing high bulk density powders of normally solid, high density olefin polymers which process comprises the steps of preparing a special titanium-containing catalyst and polymerizing olefin monomer in the presence of said catalyst under pressure in the range of from about 5 to 30 atmospheres at slurry polymerization temperature. In the preparation of the special titanium-containing catalyst, titanium tetrachloride dissolved in an inert hydrocarbon solvent is reacted using thorough stirring with diethyl aluminum monochloride also dissolved in inert hydrocarbon solvent in a manner such that the molar ratio of titanium tetrachloride to diethyl aluminum monochloride is at anytime prior to reaction of all titanium tetrachloride at least 1; the reaction product is then washed with inert hydrocarbon solvent and filtered to remove hydrocarbon-solvent-soluble impurities; and the washed reaction product is activated by adding trialkyl aluminum in amount such that the molar ratio of trialkyl aluminum and titanium-containing reaction product is from about 0.3:1 to about 3:1 in the resulting catalyst.

In addition to yielding high bulk density powders which can be utilized without further processing in most polymer fabrication operations, the process of the present invention has an additional advantage of enabling continued polymerization to high polymer solids slurries which can be stirred easily to effect adequate heat transfer. Also, the novel process of the present invention exhibits higher yields of polymer per pound of catalyst employed than those runs employing different catalysts and lower pressures do.

DESCRIPTION OF PREFERRED EMBODIMENTS

In practice of the preferred embodiments of the present invention, powders of normally solid, linear olefin polymers having bulk densities ranging from about 25 to about 35 pounds per cubic foot are produced.

The term "linear olefin polymer" means those in which the backbone chain of the macromolecule is substantially non-crosslinked and non-branched and include polymers of the ethylene, propylene, butene-1 and higher 1-alkenes having 5 to 10 carbon atoms in which polymer the linear main chain has substituent groups attached thereto arising from the substituted ethylene monomer. Also, as used herein, the term "olefin polymers" is meant to include homopolymers, copolymers and interpolymers of 1-alkenes. The molecular weights of olefin polymers made in the practice of this invention are comparable to those of olefin polymers produced in conventional Ziegler-Natta polymerization processes, e.g., from about 30,000 up to about 3 million or more.

As the first step in the preparation of the catalyst, titanium tetrachloride dissolved in an inert hydrocarbon solvent such as hexane, is reacted with diethyl aluminum monochloride also dissolved in inert hydrocarbon solvent. The reaction is carried at temperatures in the range of from about 10° to about 80° C. As is common in most preparations of Ziegler catalysts, the reaction of titanium tetrachloride and diethyl aluminum chloride has to be carried out with the exclusion of air, moisture, carbon dioxide and other known catalyst poisons. As inert hydrocarbon solvents, the acyclic and cyclic, aliphatic, saturated hydrocarbons are suitably employed. Examples of such hydrocarbons are butane, hexane, cyclohexane, heptane, pentane, octane and other hydrocarbons boiling between 60° and 250° C.

In the reaction of the titanium tetrachloride with diethyl aluminum chloride, care must be exercised to ensure that at any time prior to reaction of all of the titanium tetrachloride the molar ratio of titanium tetrachloride to diethyl aluminum chloride is at least 1. It is therefore desirable to first place the titanium tetrachloride dissolved in inert hydrocarbon solvent into an appropriate reaction vessel, and the diethyl aluminum monochloride also dissolved in inert hydrocarbon solvent is then added to the reaction vessel. Alternatively, solutions of the reactants can be fed into the reaction vessel together in such a manner that at each moment of the reaction the molar ratio of titanium compound to aluminum compound is at least one. It is found that if titanium tetrachloride comes into contact with excess diethyl aluminum chloride at any time, a high bulk density powder suitable for use directly in fabrication operations is not produced. However, following the reduction of all of the tetravalent titanium to trivalent titanium which generally occurs when a molar ratio of titanium compound to aluminum compound of about 2:1 is reached, an excess of diethyl aluminum chloride is permissible. In fact, it is generally desirable to continue addition of diethyl aluminum chloride until a molar ratio of aluminum compound to titanium compound in the range of from about 0.7:1 to about 4:1, preferably about 1.2:1, is reached.

As another critical feature in the preparation of the titanium-containing component, the concentration of the titanium tetrachloride in the inert hydrocarbon solvent is in the range of from about 19 to about 34 weight percent, perferably about 24 weight percent, and the concentration of the diethyl aluminum chloride in inert hydrocarbon solvent is in the range of from about 15 to about 40 weight percent, preferably about 25 weight percent.

As another feature, stirring of reaction mixture during preparation of the titanium-containing component is also important. For example, the use of generally low speed stirring, e.g., 50 rpm of a flat blade turbine having eight blades and an outside diameter of three inches in a 10-gallon vessel having an inside diameter of 12 inches and four baffles (1 inch = 2 feet) mounted on the sides thereof, results in formation of catalyst which forms relatively low bulk density powders. On the other hand, in cases in which the reaction to form the titanium-containing component is carried out at higher speeds, e.g., from about 300 to about 400 rpm in a similar apparatus (so-called thorough stirring), catalyst which causes the formation of high bulk density powders is produced. It is understood that rates of stirring or agitation can not be specified meaningfully in terms of revolutions per minute which apply to all agitating mechanisms; however, the foregoing description is sufficient to enable one skilled in the art of agitating systems to convert to the degree of agitation specified for the specified 10-gallon vessel containing four baffles and having a flat blade stirrer as specified to any agitation system available to the art.

Following completion of the reaction to form the titanium-containing component and prior to polymerization, it is desirable to remove hydrocarbon-soluble material including monoethyl aluminum dichloride which is formed during the reaction from the resulting titanium-containing component and any unreacted diethyl aluminum chloride. Such removal is preferably accomplished by filtering the hydrocarbon-insoluble titanium-containing component from the hydrocarbon-soluble monoethyl aluminum dichloride and washing the filtered component with additional inert hydrocarbon solvent. Care should be taken to exclude moisture, air, carbon dioxide and other catalyst poisons during the foregoing cleaning step. Following the removal of the hydrocarbon-soluble material, it is found that the molar ratio of aluminum compound to titanium compound in the titanium-containing component is from about 0.08:1 to about 0.2:1. It is believed that the titanium-containing component comprises titanium trichloride primarily in the beta-crystalline form and probably in organometallic complex with an ethyl group.

The polymerization or copolymerization to form the high bulk density powders of normally solid, linear alpha-olefin polymers or copolymers is carried out continuously or in a batchwise manner in an inert liquid hydrocarbon dispersing medium at temperatures which permit formation of polymer product in the form of solid particles (so-called slurry polymerization temperatures) and under pressure in the range of from about 5 to about 30 atmospheres, preferably from 10 to about 13 atmospheres. The polymerization reaction mixture is advantageously agitated at rates which are conventionally employed in slurry polymerization in the presence of a Ziegler catalyst, usually that rate which is sufficient to effect heat transfer.

In preferred practices, the titanium-containing component prepared in accordance with procedures set forth hereinbefore is first dispersed in an inert hydrocarbon diluent, which may be the same as the inert hydrocarbon solvent described hereinbefore; is activated with trialkyl aluminum, preferably dissolved in inert hydrocarbon solvent; and is charged to the polymerization zone which may contain additional dispersing agent, i.e., inert hydrocarbon diluent. It is understood, however, that activation can also be effected in the polymerization reactor by feeding the titanium-containing component dispersed in hydrocarbon diluent and the trialkyl aluminum dissolved in hydrocarbon solvent separately to the polymerization reactor.

For the purposes of this invention, trialkyl aluminum is meant to include trimethyl aluminum, triethyl aluminum, tri-sec-propyl aluminum, tri-n-propyl aluminum, tri-n-butyl aluminum, triisobutyl aluminum and others in which alkyl has up to 10 carbon atoms. Preferably, triisobutyl aluminum is employed as the activator.

Monomeric material is fed into the reactor at a rate sufficient to maintain a pressure of at least 5 atmospheres throughout the polymerization, preferably 10 to 13 atmospheres. The polymerization can be regulated as to molecular weight, as is known in the prior art, with such agents as hydrogen as taught in U.S. Pat. No. 3,051,690 to Vandenberg and other regulators. When hydrogen is employed as molecular weight control agent, it is preferably present in concentrations in the range of from about 15 to about 80 mole percent expressed as concentration in the gas phase of the polymerization zone. It is also understood that the monomeric material may comprise more than one aliphatic alpha-monoolefin, e.g., a combination of ethylene and butene-1 or a combination of ethylene and propylene.

The concentration of the titanium-containing component in the polymerization recipe is in the range of from about 0.15 to about 10 millimoles per liter of recipe, preferably about 1 millimole. The activator, trialkyl aluminum, is present in the recipe in concentration sufficient to provide a molar ratio of aluminum compound to titanium-containing component within the range of from about 0.3:1 to about 3:1, preferably about 1:1.

Polymerization can be advantageously continued until the amount of polymer solids reaches a value from about 500 to about 30,000 grams of polymer per gram of titanium-containing component, preferably at least about 5000 grams of polymer per gram of component.

During the preparation of catalyst and during polymerization, it is desirable to employ essentially pure starting material in order to maximize catalyst efficiency and to consistently produce powders of uniformly high bulk density.

Upon completion of polymerization, the catalyst is deactivated and polymer in powder form can be recovered in a manner which is conventional in recovery of high density olefin polymers from slurry of the polymer in an inert hydrocarbon diluent. In preferred embodiments, it is desirable to intermittently or continuously withdraw polymer slurry from the polymerization reactor to a vessel wherein inert hydrocarbon diluent and other low boiling materials are volatilized and catalyst is deactivated. From this vessel, polymer is recovered and dried to a powder having a bulk density of from about 25 to about 35 pounds per cubic foot, generally from about 27 to about 34 pounds per cubic foot.

The following example is given to illustrate the invention and should not be considered as limiting its scope. All parts and percentages are by weight unless otherwise indicated.

EXAMPLE 1

Several runs (identified as Run Nos. 1–4 in Table I) are conducted in accordance with the process of the present invention by the following procedure:

Preparation of Catalyst

Twenty-four pounds of a 25 weight percent solution of diethyl aluminum chloride in n-hexane is added at a rate of 8 pounds/hour to 36 pounds of a 23.8 weight percent n-hexane solution of titanium tetrachloride in a 10-gallon, jacketed stainless steel reactor having an inside diameter of 12 inches and a length of 2 feet and equipped with a filtering mechanism, four baffles (1 inch × 2 feet) mounted on the inner wall thereof and a single flat blade turbine having eight blades and an outside diameter of 3 inches. Addition of the diethyl aluminum chloride solution is carried out in dry, oxygen-free nitrogen atmosphere at temperature of 35° C and at agitation rate of 300 rpm, whereby a slurry of hexane-insoluble catalyst component is formed. The slurry is filtered under the nitrogen atmosphere using the filtering mechanism of the reactor and washed twice with fresh n-hexane to remove hexane-soluble materials. The washed catalyst component which contains titanium trichloride is redispersed in n-hexane to a 27 millimolar concentration thereof.

Polymerization

Into a 200-gallon, jacketed stainless steel reactor having an inside diameter of 36 inches and length of 4 feet and equipped with two flat blades turbines having six blades per turbine and each turbine having an outside diameter of 17 inches, one baffle and a level-activated dump valve for the intermittent withdrawal of polymer slurry is charged 750 pounds of n-hexane under an atmosphere of dry, oxygen-free nitrogen. The reactor is heated to 88° C, pressured to 100 psig and $H_2$ is charged into the reactor until pressure specified for the particular run in Table I is reached. The 27 millimolar dispersion of washed titanium-containing catalyst component in n-hexane and a 27 millimolar solution of triisobutyl aluminum in n-hexane are fed into the reactor at a rate of 7 pounds/hour of each. Normal hexane is pumped into the reactor at a rate of 400 pounds per hour and the feeding of ethylene into the reactor is begun after 15 pounds of combined titanium-containing component dispersion and triisobutyl aluminum solution have been added to the reactor at a flow rate which is increased as pressure and temperature permit to 134 pounds per hour. The polymerization mixture is agitated at a rate of 140 rpm. During polymerization hydrogen comprises ~43 mole percent of the gas phase with the remainder of the gas phase being essentially ethylene with trace amounts of vaporized hexane. Polymer product in the form of a slurry in which the particles of polymer in powder form have a bulk density as set forth in Table I under Primary Bulk Density is intermittently removed from the top of the reactor through the level-activated dump valve to a vessel for deactivating catalyst and recovering hexane. Catalyst is deactivated with n-propanol and volatile materials are removed by steam distillation.

The wet polymer is flash dried to less than 0.1 percent volatiles. The dried particles form a powder having a Final Bulk Density as set forth in Table I. Density of the polyethylene formed in the several runs is 0.965 gm/cm$^3$ and melt index (190° C, 2.16 Kg) thereof is in the range of 0.95 to 1.20 decig/min.

For the purposes of comparison and to show advantages of the preferred embodiments of the present invention, a run (identified in Table I as Run No. $C_1$) is also carried essentially as the foregoing runs except that pressures of 60 psig (~5 atmospheres) and monomer feed rate of 60 lbs/hour are employed during the polymerization process. Primary and Final Bulk Densities of the resulting powder are also recorded in Table I. Density and melt index (190° C, 2.16 Kg) of the polyethylene are 0.965 and 0.79 decig/min, respectively.

TABLE I

| Run Nos. | Polymerization Pressure, psig | (1) Bulk Density, lb/ft$^3$ Primary | Final | Catalyst Efficiency lb of polymer/lb Ti Compound |
|---|---|---|---|---|
| 1 | 145 | 30.3 | 33.4 | ~2400 |
| 2 | 150 | 30.3 | 32.9 | ~2400 |
| 3 | 148 | 30.2 | 33.0 | ~2400 |
| 4 | 135 | 28.3 | 32.3 | ~2400 |
| $C_1$* | 60 | 21.4 | 26.2 | ~1350 |

*Not an example of the preferred embodiments of this invention.
(1) ASTM D-716-45

What is claimed is:

1. A process for producing a high bulk density powder of a normally solid, linear olefin polymer which comprises polymerizing monomeric material of at least one alpha-monoolefin in a polymerization zone under pressure in the range of from about 5 to about 30 atmospheres at slurry polymerization temperature in an inert liquid hydrocarbon dispersing medium in the presence of a catalyst prepared by 1. reacting titanium tetrachloride dissolved in an inert hydrocarbon solvent with diethyl aluminum chloride dissolved in an organic solvent by combining the reactants with thorough stirring in a manner such that the molar ratio of titanium tetrachloride to diethyl aluminum monochloride at anytime prior to the reaction of all of the titanium tetrachloride is at least 1;

2. removing hydrocarbon solvent soluble impurities from the resulting hydrocarbon solvent-insoluble, titanium-containing reaction product;

3. activating said hydrocarbon solvent-insoluble reaction produce by combining said produce with a trialkyl aluminum, in an inert hydrocarbon liquid dispersing medium in a manner such that the molar ratio of trialkyl aluminum to said titanium-containing reaction product is from about 0.3:1 to about 3:1.

2. The process according to claim 1 wherein the polymerization is carried out under pressure in the range of from about 10 to about 13 atmospheres.

3. The process according to claim 2 wherein the alpha-monoolefin is ethylene.

4. The process according to claim 3 wherein hydrogen is present during polymerization in concentration in the range of from about 15 to about 80 mole percent of the gas phase of the polymerization zone.

5. The process according to claim 4 wherein the dispersing medium and hydrocarbon solvent is n-hexane.

6. The process according to claim 5 wherein the trialkyl aluminum is triisobutyl aluminum.

7. The process according to claim 1 wherein the concentration of the titanium tetrachloride in the inert hydrocarbon solvent is in the range from about 19 to about 34 weight percent and the concentration of the diethyl aluminum chloride is an inert hydrocarbon solvent is in the range from about 15 to about 40 weight percent and the polymerization is carried out under pressure in the range from about 10 to about 30 atmospheres.

8. The process according to claim 1 wherein monomeric material consists essentially of a combination of ethylene and butene-1.

9. The process according to claim 1 wherein the monomeric material consists essentially of ethylene and propylene.

10. The process according to claim 2 wherein monomeric material consists essentially of ethylene or a combination of ethylene and butene-1.

* * * * *

UNITED STATES PATENT AND TRADEMARK OFFICE
CERTIFICATE OF CORRECTION

PATENT NO. : 3,907,760
DATED : September 23, 1975
INVENTOR(S) : Gordon Y. T. Liu, Donald R. Smith, Robert D. Bridges It is certified that error appears in the above-identified patent and that said Letters Patent are hereby corrected as shown below:

Column 1, line 30, delete "27" and insert --22--.

Column 4, line 16, delete "pressure" and insert --pressures--.

Column 4, line 48, delete "in" and insert --from--.

Column 5, line 8, delete "material" and insert --materials--.

Column 7, line 7, delete "produce" and insert --product--.

Column 8, line 8, delete "is" and insert --in--.

Signed and Sealed this

Twenty-eighth Day of September 1976

[SEAL]

*Attest:*

RUTH C. MASON
*Attesting Officer*

C. MARSHALL DANN
*Commissioner of Patents and Trademarks*